United States Patent [19]
Powell

[11] Patent Number: 5,377,497
[45] Date of Patent: Jan. 3, 1995

[54] TIMED-OFF CONTROL APPARATUS AND METHOD

[75] Inventor: Joe R. Powell, Garland, Tex.

[73] Assignee: Lennox Industries Inc., Richardson, Tex.

[21] Appl. No.: 170,526

[22] Filed: Dec. 17, 1993

[51] Int. Cl.⁶ .......................................... G05D 23/32
[52] U.S. Cl. .................................... 62/158; 307/141.4; 361/22; 417/12
[58] Field of Search ................... 62/158, 231, 202; 165/12; 417/12; 361/22; 307/141, 141.4

[56] References Cited

U.S. PATENT DOCUMENTS 3,864,611 2/1975 Chang .............................. 361/22 X
4,991,049 2/1991 Kadah .............................. 361/22 X

*Primary Examiner*—William E. Wayner
*Attorney, Agent, or Firm*—W. Kirk McCord

[57] ABSTRACT

An improved timed-off control apparatus and method are provided to prevent excessive cycling of an electrically operated device, such as an air conditioning compressor. The timed-off control apparatus provides a predetermined timed-off period (e.g., five minutes), during which the electrically operated device is constrained to remain in an off state after the device is deactivated by a loss of power. For example, in an air conditioning system, fluctuations in power supply voltage and thermostat switch bounces may result in excessive cycling of the system compressor. By constraining the compressor to remain deactivated for the selected timed-off period, the compressor is protected against excessive cycling. In order to achieve consistent and predictable timed-off periods, a field effect transistor (FET) is used in conjunction with a resistance/capacitance (RC) circuit. When the power supply is interrupted, the FET is turned off state and remains off during the timed-off period. When the FET is off, the compressor remains off, even if electrical power becomes available during the timed-off period. The FET monitors the voltage across the capacitor of the RC circuit while the capacitor is being discharged and when the voltage drops below a predetermined threshold, the FET is turned on to allow resumption of compressor operation. The time at which the voltage across the capacitor reaches the predetermined threshold is a function of the capacitor discharge rate. Because the FET does not draw biasing current, the capacitor discharge rate is not affected by the FET. Therefore, consistent and predictable timed-off periods are achieved.

20 Claims, 1 Drawing Sheet

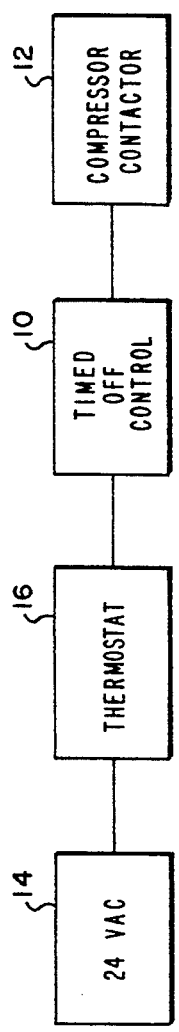
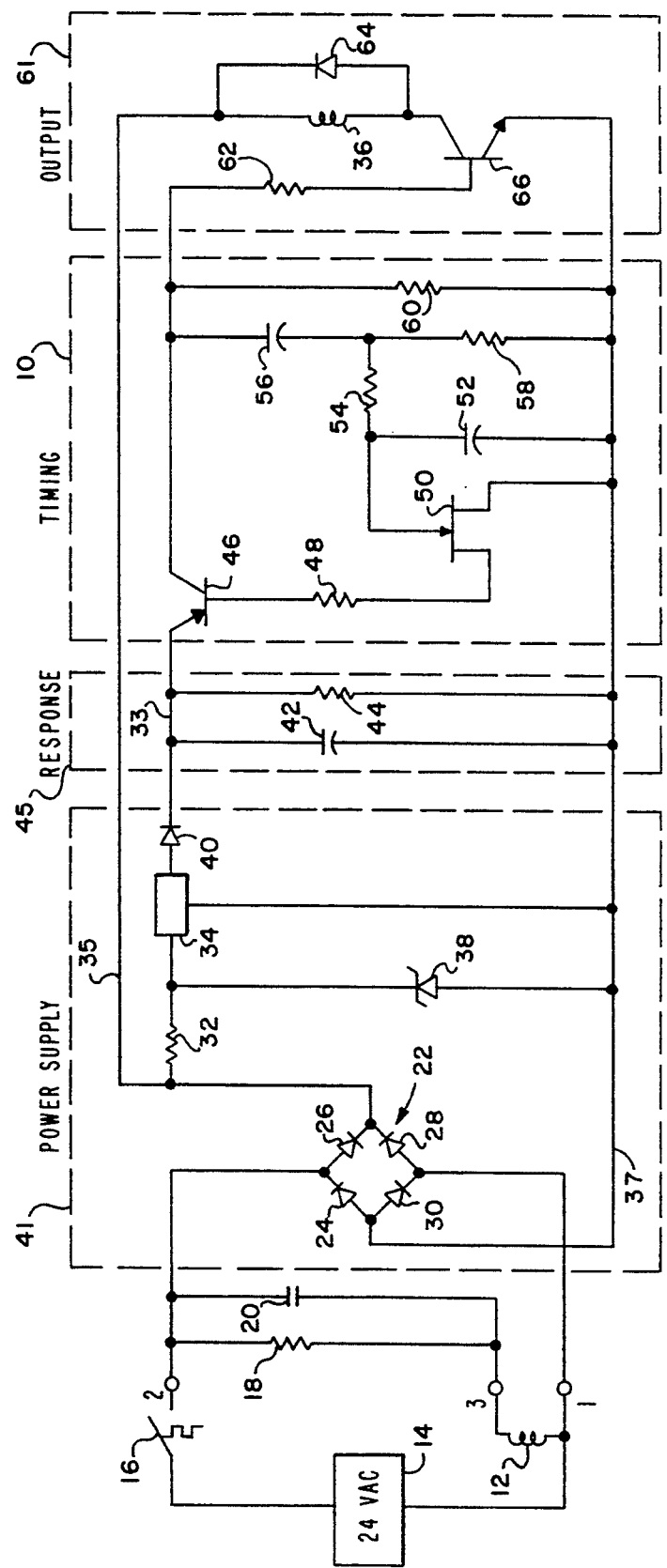

TIMED-OFF CONTROL APPARATUS AND METHOD

TECHNICAL FIELD

This invention relates generally to automatic timed-off control apparatus and, in particular, to an improved timed-off control apparatus and method providing a consistent and predictable timed-off period.

BACKGROUND ART

In order to protect an electrically operated device from losses of and fluctuations in line voltage supplying the device, the device should remain in an "off" mode for a predetermined time before being restarted after a power outage. For example, in a thermostat-controlled air conditioning system, line voltage fluctuations and thermostat switch bounces may cause excessive cycling of the system compressor. Further, the compressor may be re-started after a power outage before refrigerant pressure has been equalized across the compressor. Therefore, a timed-off period (e.g., five minutes) is required before the compressor is re-started after being turned off.

According to prior practice, a resistance capacitance (RC) circuit is used to provide timed-off control. The discharge rate of the capacitor after a power outage determines the time that the compressor remains in an "off" mode before being re-started. A voltage monitoring device (e.g., a bipolar transistor) is typically used to measure the voltage across the resistor in the RC circuit. When the measured voltage drops to a predetermined level, the voltage measuring device will allow the compressor to be re-started.

One problem associated with such prior art timed-off control apparatus is that the voltage monitoring device typically draws electrical current, which distorts the measured voltage drop across the resistor. For example, when a bipolar transistor is used to monitor voltage, a certain amount of electric current is used as biasing current for the bipolar transistor. This biasing current affects the discharge rate of the capacitor, such that the timed-off control apparatus does not provide a consistent and predictable timed-off period.

There is therefore a need for an improved timed-off control apparatus and method which provides a consistent and predictable timed-off period. There is also a need for an improved timed-off control apparatus and method which provides electric current for thermostat anticipation during timed-off periods.

DISCLOSURE OF INVENTION

In accordance with the present invention, apparatus is provided for controlling start-up of an electrically operated device after an electrical power supply outage. The apparatus is comprised of resistor means having a predetermined electrical resistance; capacitor means having a predetermined electrical capacitance and being electrically connected to the resistor means; field effect transistor means electrically connected to the capacitor means and to the resistor means and being responsive to voltage across the capacitor means when the capacitor means is being discharged; and switch means electrically connected in series between the electrical power supply and the device. The capacitor means is chargeable by the electrical power supply and is dischargeable at a predetermined rate in response to an electrical power supply outage. The field effect transistor means is turned off in response to a first voltage indicating that the capacitor means is being discharged and is turned on in response to a second voltage indicating that the capacitor means has been discharging for a predetermined time. The switch means is opened by the field effect transistor means in response to the first voltage for isolating the electrical power supply from the device and is closed by the field effect transistor means in response to the second voltage for electrically connecting the electrical power supply to the device.

In one embodiment, the capacitor means is electrically connected in series with the resistor means. The field effect transistor means has a source, gate and drain. The gate is electrically connected between the capacitor means and the resistor means on one side of the resistor means and the source is electrically connected to said resistor means on an opposite side thereof from the gate In another embodiment, the switch means includes bipolar transistor means having an emitter, base and collector. The base is electrically connected to the drain such that when the field effect transistor means is turned on, the field effect transistor means provides sufficient biasing current to turn on the bipolar transistor means. The biasing current is discontinued when the field effect transistor means is turned off, thereby also turning off the bipolar transistor means.

In accordance with one feature of the invention, response delay means is provided for imposing a predetermined time delay between an electrical power outage and the response of the capacitor means to the electrical power outage. In yet another embodiment, the resistor means includes a first resistor and the capacitor means includes a first capacitor. The response delay means includes a second resistor having a predetermined electrical resistance and a second capacitor having a predetermined electrical capacitance. The second capacitor is electrically connected to the second resistor, is chargeable by the electrical power supply and is dischargeable at a predetermined rate in response to the electrical power supply outage. The second capacitor inhibits discharging of the first capacitor until the second capacitor has been substantially completely discharged. The discharge time of the second capacitor corresponds to the predetermined time delay.

In the preferred embodiment, the apparatus provides timed-off control of an electrically operated compressor in an air conditioning system after an electrical power supply outage. The compressor is maintained in an "off" state for a predetermined time (e.g., five minutes) after an electrical power supply outage. In accordance with another feature of the invention, the air conditioning system further includes an electrically operated thermostat for controlling operation of the compressor, the resistor means including a first resistor, and the apparatus further includes a second resistor coupled between the electrical power supply and the thermostat for providing electric current for thermostat anticipation when the switch means is open.

BRIEF DESCRIPTION OF DRAWINGS

FIG. 1 is a block diagram illustrating the application of a timed-off control apparatus, according to the present invention, in controlling the timed-off period of an air conditioning compressor; and FIG. 2 is an electrical circuit diagram of the timed-off control apparatus, according to the present invention.

BEST MODE FOR CARRYING OUT THE INVENTION

The best mode for carrying out the invention will be described with reference to the accompanying drawings. The drawings are not necessarily to scale and in some instances portions may have been exaggerated in order to more clearly depict certain features of the invention. Like parts are marked with the same respective reference numbers throughout the drawings.

Referring now to FIG. 1, a timed-off control apparatus 10, according to the present invention, is electrically connected in series between an air conditioning system compressor contactor 12 and a 24-volt AC power supply 14. When contactor 12 is energized, the air conditioning system compressor (not shown) is activated. When contactor 12 is de-energized, the air conditioning compressor is de-activated. A conventional thermostat 16 is provided for controlling the operation of the air conditioning system compressor in response to the demand for cooling. Thermostat 16 is electrically connected in series between apparatus 10 and power supply 14. As will be described in greater detail hereinafter, apparatus 10 prevents contactor 12 from being energized (and hence the compressor from being operated) for a predetermined period (e.g., five minutes) after a loss or interruption of electrical power supplying contactor 12. The timed-off period begins when electrical power is lost and the compressor remains in an "off" mode for the predetermined timed-off period, even if electrical power becomes available during the timed-off period.

Referring now to FIG. 2, the 24-volt AC power supply 14 is connected to pins 1 and 2. Contactor 12 is preferably an AC inductive coil. A resistor 18 provides anticipation current for thermostat 16. The anticipation current flowing through resistor 18 is not sufficient to energize contactor 12 when relay switch 20 is open (as is shown in FIG. 2), so that the compressor is not operated when relay switch 20 is open. When relay switch 20 is closed, 24-volt AC power is provided on pin 3, whereby contactor 12 is energized and the compressor activated.

The 24-volt AC power on pins 1 and 2 is converted to 24-volt DC by a full-wave rectifier 22, which is comprised of diodes 24, 26, 28 and 30. The 24-volt DC output of rectifier 22 passes through a resistor 32 to a regulator 34, which converts the 24-volt DC to 12-volt DC on conductor 33. The 24-volt DC is also transmitted on conductor 35 to a relay coil 36, which controls relay switch 20. Coil 36 is preferably a DC inductive coil. As long as the 24-volt DC is supplied to relay 36, switch 20 will remain in a closed position, to allow 24-volt AC power to be supplied to contactor 12, whereby contactor 12 is energized for operating the compressor. A zener diode 38 is connected between conductors 35 and 37. Diode 38 and resistor 32 function as a pre-regulator and cooperate to protect regulator 34 from voltages greater than 27 volts. Diode 40 protects regulator 34 from feedback current from capacitor 42, when capacitor 42 is discharging. The operation of capacitor 42 will be described in greater detail hereinafter. Rectifier 22, resistor 32, diode 38, regulator 34 and diode 40 comprise a power supply circuit 41 for supplying 24-volt and 12-volt DC power.

Capacitor 42 and resistor 44 comprise a response circuit 45. Capacitor 42 and resistor 44 are connected between conductors 33 and 37. As long as 12-volt DC is supplied on conductor 33, capacitor 42 is being charged. If the 12-volt DC is interrupted because of a loss or interruption in the power supply, capacitor 42 will begin discharging to at least temporarily provide DC power to timed-off control circuit 10. Capacitor 42 has an electrical capacitance such that capacitor 42 will have been discharging for a predetermined period (e.g., 20–30 milliseconds) before timed-off control operation begins. Response circuit 45 therefore provides a predetermined time delay (e.g., 20–30 milliseconds) between the loss of 12-volt DC power on conductor 33 and the activation of timed-off control, so that interruptions in the 12-volt DC power supply for a period less than the predetermined period of response circuit 45 will not trigger timed-off control circuit 10.

Timed-off control circuit 10 is comprised of a PNP bipolar transistor 46, a resistor 48, a field effect transistor (FET) 50, a capacitor 52, a resistor 54, a capacitor 56, and resistors 58 and 60. When 24-volt AC power is supplied to contactor 12, 12-volt DC is supplied on conductor 33 and capacitor 56 is being charged. The gate voltage of FET 50 is higher than the source voltage by an amount substantially equal to the voltage across resistor 58 (e.g., 0.5 volt), which results in FET 50 being "on" and transistor 46 being biased "on" by current flowing through FET 50. Current flows through transistor 46 on conductor 33.

An output circuit 61 is comprised of resistor 62, relay 36, diode 64, and NPN bipolar transistor 66. Current flows through resistor 62 to bias transistor 66 in an "on" state, whereby electric current flows through relay 36 and through transistor 66. Electric current flow through relay 36 closes switch 20, as previously described, which provides 24-volt AC power to energize contactor 12. Diode 64 protects transistor 66 from inductive kickback from relay 36.

After capacitor 42 has been discharged for the predetermined period of response circuit 45 (e.g., 20–30 milliseconds) following an interruption in the power supply, the emitter voltage of transistor 46 has dropped below the collector voltage of transistor 46. When this condition occurs, capacitor 56 becomes a source and begins to discharge, thereby reverse biasing resistor 58 and FET 50. When FET 50 is reverse biased, the gate voltage becomes less than the source voltage. When the gate voltage falls below the source voltage by an amount greater than the cutoff voltage of FET 50 (hereinafter referred to as Vgs), FET 50 is turned off, which terminates the biasing current applied to transistor 46 through resistor 48.

The voltage difference Vgs between the gate and source of FET 50 at which FET 50 switches from "on" to "off" is a known parameter of FET 50. For example, Vgs may be on the order of −0.5 volt (i.e., the gate voltage is 0.5 volt below the source voltage). The actual voltage difference between the gate and source, Vf, when capacitor 56 is discharging, is a function of the elapsed discharge time of capacitor 56 and is expressed by the following equation:

$$Vf = Vo e^{-t/rc}$$

where Vo is the voltage across capacitor 56 when capacitor 56 begins to discharge (e.g., −11.5 volts);
 t is the elapsed discharge time of capacitor 56;
 r is the resistance of resistor 58; and
 c is the capacitance of capacitor 56.

The reverse biasing of resistor 58 and FET 50, which occurs when capacitor 56 begins to discharge, immediately switches FET 50 from an "on" to an "off" state, thereby turning off transistor 46. For example, Vf may be 0.5 volt when FET 50 is "on" and −11.5 volts when FET 50 is switched "off". When Vf is greater than Vgs, FET 50 is "on"; when Vf is less than or equal to Vgs, FET 50 is "off". When transistor 46 is turned off, the biasing current supplied to transistor 66 through resistor 62 is shut off, thereby turning off transistor 66 and interrupting the current flow through relay 36. The interruption in current flow through relay 36 causes switch 20 to open, thereby interrupting the 24-volt AC power supplied to contactor 12. FET 50 will remain in an "off" state until Vf is greater than Vgs.

One skilled in the art will recognize from the foregoing equation that the rate of discharge of capacitor 56 will determine the elapsed time t required for Vf to exceed Vgs. By selecting FET 50 with a known Vgs parameter and capacitor 56 with a known capacitance and discharge rate, the desired timed-off period (e.g., five minutes) can be selected with precision. Unlike a bipolar transistor, which draws biasing current, FET 50 is switched on and off depending on the voltage difference between the gate and source of FET 50 and the polarity thereof. FET 50 does not draw biasing current, which can distort the discharge rate of capacitor 56 and lead to inconsistent and unpredictable timed-off periods.

Timed-off control circuit 10 operates by means of electrical energy stored by capacitor 56 when 12-volt DC power is supplied to circuit 10. When the 12-volt DC power supply is discontinued, capacitor 56 begins discharging, thereby supplying the necessary power for circuit 10 during the timed-off period. The timed-off control circuit according to the present invention provides consistent and predictable timed-off periods, using relatively inexpensive circuitry and without requiring any external power source such as a battery.

At the end of the timed-off period (e.g., five minutes), Vf is greater than Vgs and FET 50 is switched to an "on" state, thereby biasing transistor 46 "on" such that when 12-volt DC power is applied to the emitter of transistor 46, electric current flows through transistor 46, resistor 60 and resistor 62. Resumption of current flow through resistor 62 turns on transistor 66, thereby allowing current to flow through relay 36 and energizing contactor 12.

In the preferred embodiment, resistor 18 is a 500-ohm resistor, diodes 24, 26, 28, 30, 40 and 64 are diodes of the 1N4004 type. Diode 38 is a zener diode of the 1N4751A type. Resistor 32 is a 330-ohm resistor; resistor 44 is a 10K-ohm resistor; resistor 48 is a 47K-ohm resistor; resistor 54 is a 2.7K-ohm resistor; resistor 58 is a 4.42M-ohm resistor; resistor 60 is a 10K-ohm resistor; and resistor 62 is a 22K-ohm resistor. Capacitor 42 has a capacitance of 47 microfarads (MFD); capacitor 52 has a capacitance of 0.47 MFD; and capacitor 56 has a capacitance of 22 MFD. Regulator 34 is a voltage regulator of the MC78L12ACZ type. Transistor 46 is a PNP bipolar transistor of the MPS2907 type; transistor 50 is an N-channel, depletion mode field effect transistor of the 2N4338 type; and transistor 66 is an NPN bipolar transistor of the MPSA06 type.

The best mode for carrying out the invention has now been described. Since it is obvious that changes in and additions to the above-described mode may be made without departing from the nature, spirit and scope of the invention, the invention is not to be limited to the details set forth herein.

I claim:

1. Apparatus for controlling start-up of an electrically operated device after an electrical power supply outage, said apparatus comprising:
   resistor means having a predetermined electrical resistance;
   capacitor means having a predetermined electrical capacitance and being electrically connected to said resistor means, said capacitor means being chargeable by an electrical power supply and being dischargeable at a predetermined rate in response to an electrical power supply outage;
   field effect transistor means electrically connected to said capacitor means and to said resistor means and being responsive to voltage across said capacitor means when said capacitor means is being discharged, said field effect transistor means being turned off in response to a first voltage indicating that said capacitor means is being discharged and being turned on in response to a second voltage indicating that said capacitor means has been discharging for a predetermined time; and
   switch means electrically connected in series between the electrical power supply and the device, said switch means being opened by said field effect transistor means in response to said first voltage for isolating the electrical power supply from the device and being closed by said field effect transistor means in response to said second voltage for electrically connecting the electrical power supply to the device.

2. Apparatus of claim 1 wherein said capacitor means is electrically connected in series with said resistor means, said field effect transistor means having a source, gate and drain, said gate being electrically connected between said capacitor means and said resistor means on one side of said resistor means, said source being electrically connected to said resistor means on an opposite side thereof from said one side.

3. Apparatus of claim 2 wherein said switch means includes bipolar transistor means having an emitter, base and collector, said base being electrically connected to said drain such that when said field effect transistor means is turned on, said field effect transistor means provides sufficient biasing current to turn on said bipolar transistor means, said biasing current being discontinued when said field effect transistor means is turned off, thereby also turning off said bipolar transistor means.

4. Apparatus of claim 1 further including response delay means for imposing a predetermined time delay between an electrical power supply outage and the response of said capacitor means to the electrical power supply outage.

5. Apparatus of claim 4 wherein said resistor means includes a first resistor and said capacitor means includes a first capacitor, said response delay means including a second resistor having a predetermined electrical resistance and a second capacitor having a predetermined electrical capacitance, said second capacitor being electrically connected to said second resistor and being chargeable by the electrical power supply, said second capacitor being dischargeable at a predetermined rate in response to the electrical power supply outage, said second capacitor inhibiting discharging of said first capacitor until said second capacitor has been substantially completely discharged, the discharge time of said second capacitor corresponding to said predetermined time delay.

6. Apparatus of claim 1 wherein said field effect transistor means includes a field effect transistor having a source, gate and drain, said field effect transistor having a predetermined voltage parameter corresponding to a threshold voltage between said gate and said source, said field effect transistor being turned off when the voltage between said gate and said source is less than or equal to said threshold voltage, said field effect transistor being turned on when the voltage between said gate and said source is greater than said threshold voltage, said first voltage corresponding to said threshold voltage and said second voltage being greater than said threshold voltage.

7. In an air conditioning system having an electrically operated compressor, apparatus for providing timed-off control of the compressor after an electrical power supply outage, said apparatus comprising:

resistor means having a predetermined electrical resistance;

capacitor means having a predetermined electrical capacitance and being electrically connected to said resistor means, said capacitor means being chargeable by an electrical power supply and being dischargeable at a predetermined rate in response to an electrical power supply outage;

field effect transistor means electrically connected to said capacitor means and to said resistor means and being responsive to voltage across said capacitor means when said capacitor means is being discharged, said field effect transistor means being turned off in response to a first voltage indicating that said capacitor means is being discharged and being turned on in response to a second voltage indicating that said capacitor means has been discharging for a predetermined time; and switch means electrically connected in series between the electrical power supply and the compressor, said switch means being opened by said field effect transistor means in response to said first voltage for isolating the electrical power supply from the compressor and being closed by said field effect transistor means in response to said second voltage for electrically connecting the electrical power supply to the compressor.

8. Apparatus of claim 7 wherein said capacitor means is connected in series with said resistor means, said field effect transistor means having a source, gate and drain, said gate being connected between said capacitor means and said resistor means on one side of said resistor means, said source being connected to said resistor means on an opposite side thereof from said one side.

9. Apparatus of claim 8 wherein said switch means includes bipolar transistor means having an emitter, base and collector, said base being connected to said drain such that when said field effect transistor means is turned on, said field effect transistor means provides sufficient biasing current to turn on said bipolar transistor means, said biasing current being discontinued when said field effect transistor means is turned off, thereby also turning off said bipolar transistor means.

10. Apparatus of claim 7 further including response delay means for imposing a predetermined time delay between an electrical power supply outage and the response of said capacitor means to the electrical power supply outage.

11. Apparatus of claim 10 wherein said resistor means includes a first resistor and said capacitor means includes a first capacitor, said response delay means including a second resistor having a predetermined electrical resistance and a second capacitor having a predetermined electrical capacitance, said second capacitor being electrically connected to said second resistor and being chargeable by the electrical power supply, said second capacitor being dischargeable at a predetermined rate in response to the electrical power supply outage, said second capacitor inhibiting discharging of said first capacitor until said second capacitor has been substantially completely discharged, the discharge time of said second capacitor corresponding to said predetermined time delay.

12. Apparatus of claim 7 wherein said field effect transistor means includes a field effect transistor having a source, gate and drain, said field effect transistor having a predetermined voltage parameter corresponding to a threshold voltage between said gate and said source, said field effect transistor being turned off in response to the voltage between said gate and said source being less than or equal to said threshold voltage, said field effect transistor being turned on in response to the voltage between said gate and said source being greater than said threshold voltage, said first voltage corresponding to said threshold voltage and said second voltage being greater than said threshold voltage.

13. Apparatus of claim 7 wherein the air conditioning system further includes an electrically operated thermostat for controlling operation of the compressor, said resistor means including a first resistor, said apparatus further including a second resistor coupled between the electrical power supply and the thermostat for providing electric current for thermostat anticipation when said switch means is open.

14. A method for controlling start-up of an electrically operated device after an electrical power supply outage, said method comprising:

providing resistor means having a predetermined electrical resistance and capacitor means having a predetermined electrical capacitance, said capacitor means being chargeable by an electrical power supply and being dischargeable at a predetermined rate in response to an electrical power supply outage;

electrically connecting said capacitor means to said resistor means;

electrically connecting field effect transistor means to said capacitor means and to said resistor means and using said field effect transistor means to monitor voltage across said capacitor means when said capacitor means is being discharged, said field effect transistor means being turned off in response to a first voltage indicating that said capacitor means is being discharged and being turned on in response to a second voltage indicating that said capacitor means has been discharging for a predetermined time; and isolating the electrical power supply from the device in response to said first voltage and electrically connecting the electrical power supply to the device in response to said second voltage.

15. The method of claim 14 wherein said capacitor means is electrically connected in series with said resistor means, said field effect transistor means having a source, gate and drain, said electrically connecting said field effect transistor means to said capacitor means and to said resistor means including electrically connecting said gate between said capacitor means and said resistor means on one side of said resistor means and electrically connecting said source to said resistor means on an opposite side of thereof from said one side.

16. The method of claim 15 wherein said isolating the electrical power supply and said electrically connecting the electrical power supply include providing switch means, electrically connecting said switch means in series between the electrical power supply and the device and using said field effect transistor means to control opening and closing of said switch means, said switch means being opened by said field effect transistor means in response to said first voltage for isolating the electrical power supply from the device and being closed by said field effect transistor means in response to said second voltage for electrically connecting the electrical power supply to the device.

17. The method of claim 16 wherein said switch means includes bipolar transistor means having an emitter, base and collector, said using said field effect transistor means to control opening and closing of said switch means including electrically connecting said base to said drain so that when said field effect transistor means is turned on, said field effect transistor means provides sufficient biasing current to turn on said bipolar transistor means, said biasing current being discontinued when said field effect transistor means is turned off, thereby also turning off said bipolar transistor means.

18. The method of claim 14 further including imposing a predetermined time delay between an electrical power supply outage and the response of said capacitor means to the electrical power supply outage.

19. Apparatus of claim 18 wherein said resistor means includes a first resistor and said capacitor means includes a first capacitor, said imposing including providing a second resistor having a predetermined electrical resistance and a second capacitor having a predetermined electrical capacitance, electrically connecting said second capacitor to said second resistor, allowing said second capacitor to be charged by the electrical power supply and allowing said second capacitor to be discharged at a predetermined rate in response to the electrical power supply outage, said second capacitor inhibiting discharging of said first capacitor until said second capacitor has been substantially completely discharged, the discharge time of said second capacitor corresponding to said predetermined time delay.

20. Apparatus of claim 14 wherein said field effect transistor means includes a field effect transistor having a source, gate and drain, said field effect transistor having a predetermined voltage parameter corresponding to a threshold voltage between said gate and said source, said using including allowing said field effect transistor to be turned off in response to the voltage between said gate and said source being less than or equal to said threshold voltage and to be turned on in response to the voltage between said gate and said source being greater than said threshold voltage, said first voltage corresponding to said threshold voltage and said second voltage being greater than said threshold voltage.

* * * * *